United States Patent
Cho et al.

(10) Patent No.: US 10,800,422 B1
(45) Date of Patent: Oct. 13, 2020

(54) SHIFTING CONTROL METHOD FOR VEHICLE WITH DCT

(71) Applicants: Hyundai Motor Company, Seoul (KR); Kia Motors Corporation, Seoul (KR)

(72) Inventors: Sung Hyun Cho, Yongin-si (KR); Su Hwan Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/531,627

(22) Filed: Aug. 5, 2019

(30) Foreign Application Priority Data

Mar. 26, 2019 (KR) .......................... 10-2019-0034206

(51) Int. Cl.

| | |
|---|---|
| *B60W 30/19* | (2012.01) |
| *B60W 10/02* | (2006.01) |
| *B60W 10/113* | (2012.01) |
| *F16H 59/46* | (2006.01) |
| *F16H 61/04* | (2006.01) |
| *F16H 61/682* | (2006.01) |

(52) U.S. Cl.
CPC ............ *B60W 30/19* (2013.01); *B60W 10/02* (2013.01); *B60W 10/113* (2013.01); *F16H 59/46* (2013.01); *F16H 61/0403* (2013.01); *F16H 61/0437* (2013.01); *F16H 61/682* (2013.01); *B60W 2510/0638* (2013.01); *B60W 2710/027* (2013.01); *B60W 2710/1005* (2013.01); *B60Y 2300/19* (2013.01); *F16H 2059/462* (2013.01); *F16H 2306/48* (2013.01); *F16H 2306/54* (2013.01)

(58) Field of Classification Search
None
See application file for complete search history.

(56) References Cited

U.S. PATENT DOCUMENTS

| | | | |
|---|---|---|---|
| 2015/0024905 A1* | 1/2015 | Dunfee, II | ............. F16D 48/06 477/77 |
| 2015/0166040 A1* | 6/2015 | Cho | ...................... F16H 61/688 701/53 |
| 2016/0069453 A1 | 3/2016 | Atmaram et al. | |

FOREIGN PATENT DOCUMENTS

| | | |
|---|---|---|
| JP | 2008-032184 A | 2/2008 |
| JP | 2008-032185 A | 2/2008 |

(Continued)

*Primary Examiner* — Colby M Hansen
(74) *Attorney, Agent, or Firm* — Morgan, Lewis & Bockius LLP

(57) ABSTRACT

A shift control method of a vehicle with a dual clutch transmission (DCT) may include: a first preparing step of, by a controller, controlling a torque of an N-th stage clutch to a predetermined minimum torque and increasing a torque of an N−1-th stage clutch to a predetermined standby torque; a first handover step of releasing the torque of the N-th stage clutch and increasing the torque of the N−1-th stage clutch; a gear changing step of releasing an N-th stage gear and then initiating an engagement of an N−2-th stage gear; a synchronization maintaining step of maintaining a synchronized state by adjusting the torque of the N−1-th stage clutch; a second preparing step of increasing the torque of the N−2-th stage clutch to the standby torque; and a second handover step of releasing the torque of the N−1-th clutch and increasing the torque of the N−2-th stage clutch.

9 Claims, 3 Drawing Sheets

(56) References Cited

FOREIGN PATENT DOCUMENTS

| | | | |
|---|---|---|---|
| JP | 2008-106821 | A | 5/2008 |
| KR | 10-1601411 | B1 | 3/2016 |
| KR | 10-1694029 | B1 | 1/2017 |
| KR | 10-1795152 | B1 | 11/2017 |

* cited by examiner

SHIFTING CONTROL METHOD FOR VEHICLE WITH DCT

CROSS REFERENCE TO RELATED APPLICATION

The present application claims priority to Korean Patent Application No. 10-2019-0034206, filed Mar. 26, 2019, the entire contents of which is incorporated herein for all purposes by this reference.

BACKGROUND OF THE INVENTION

Field of the Invention

The present invention relates to a shifting control method for a vehicle with a dual clutch transmission (DCT), and more particularly, to a technology for a control method of same-shaft shifting.

Description of Related Art

In a dual clutch transmission (DCT), one of two clutches is mounted to implement an odd-numbered shifting stage of a series of shifting stages and the other is mounted to implement an even-numbered shifting stage. In a state in which a gear of a target shifting stage is previously engaged, shifting is performed by engaging a clutch (hereinafter, referred to as a coupling clutch) for the target shifting stage while releasing a clutch (hereinafter, referred to as a releasing clutch) for a current shifting stage, preventing torque interruption and improving shifting quality during the shifting. This is called so-called "different-shaft shifting".

In a case of "same-shaft shifting" in which two shift stags are to be shifted at once in the DCT as described above, i.e., a case in which the shifting is to be performed from the odd-numbered shifting stage to the odd-numbered shifting stage, or from the even-numbered shifting stage to the even-numbered shifting stage, the shifting to the target shifting stage is not directly performed due to a hardware structure as described above, and the shifting is performed by sequentially performing the above-mentioned different-shaft shifting in which the shifting is performed from the odd-numbered shifting stage to the even-numbered shift stage, or from the even-numbered shifting stage to the odd-numbered shifting stage.

Therefore, since the same-shaft shifting of the DCT is always implemented by sequentially performing different-shaft shifting, responsiveness thereof is lower than that of an automatic transmission using a conventional planetary gear train and friction elements.

Meanwhile, a power on down shift means that the shifting is performed to a lower shifting stage in a state in which a driver steps on an accelerator pedal.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shifting control method of a vehicle with a dual-clutch transmission (DCT) configured for ultimately improving a commercial value of a vehicle by improving shifting responsiveness to minimize disadvantages of the DCT at the time of a same-shaft power one down shift by an accelerator pedal operation of a driver in a DCT-provided vehicle.

According to an exemplary embodiment of the present invention, a shift control method of a vehicle with a dual clutch transmission (DCT) may include: a first preparing step of, by a controller, controlling a torque of an N-th stage clutch to a predetermined minimum torque and increasing a torque of an N−1-th stage clutch to a predetermined standby torque, when a same-shaft power on down shift is initiated and an engagement of an N−1-th stage gear is completed; a first handover step of, by the controller, releasing the torque of the N-th stage clutch and increasing the torque of the N−1-th stage clutch, when the torque of the N−1-th stage clutch reaches the standby torque and a rotation speed of an engine is equal to or greater than a speed of the N−1-th stage clutch; a gear changing step of, by the controller, releasing an N-th stage gear and then initiating an engagement of an N−2-th stage gear; a synchronization maintaining step of, by the controller, maintaining a synchronized state by adjusting the torque of the N−1-th stage clutch when it is determined that the rotation speed of the engine is synchronized with a speed of the N−2-th stage clutch; a second preparing step of, by the controller, increasing the torque of the N−2-th stage clutch to the standby torque when the engagement of the N−2-th stage gear is completed; and a second handover step of, by the controller, releasing the torque of the N−1-th clutch and increasing the torque of the N−2-th stage clutch, when the torque of the N−2-th stage clutch reaches the standby torque.

The controller may be configured to determine whether an inter-stage ratio between an N-th stage, which is a current stage, and an N−2-th stage, which is a final target stage, is equal to or greater than a predetermined reference inter-stage ratio, before the first preparing step, and perform the first preparing step only when the inter-stage ratio is equal to or greater than the predetermined reference inter-stage ratio.

The controller may be configured to determine whether or not a current shifting is a shifting situation during shifting before the first preparing step, and perform the first preparing step only when the current shifting is not the shifting situation during shifting.

In the first handover step, the controller may increase the torque of the N−1-th stage clutch at a predetermined first slope while releasing the torque of the N-th stage clutch during a predetermined first target time.

In the gear changing step, the controller may release the N-stage gear and initiate the engagement of the N−2-th gear, after completely releasing the torque of the N-th stage clutch.

The controller may increase the torque of the N−1-th stage clutch in succession to the first handover step during the gear changing step.

In the synchronization maintaining step, the controller may feedback-control the torque of the N−1-th stage clutch to maintain the synchronized state.

The controller may confirm whether or not the rotation speed of the engine maintains a state synchronized with the speed of the N−2-th stage clutch when the torque of the N−2-th stage clutch reaches the standby torque, and perform the second handover step only when the synchronized state is maintained.

In the second handover step, the controller may increase the torque of the N−2-th stage clutch at a predetermined second slope while releasing the torque of the N−1-th stage clutch during a predetermined second target time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
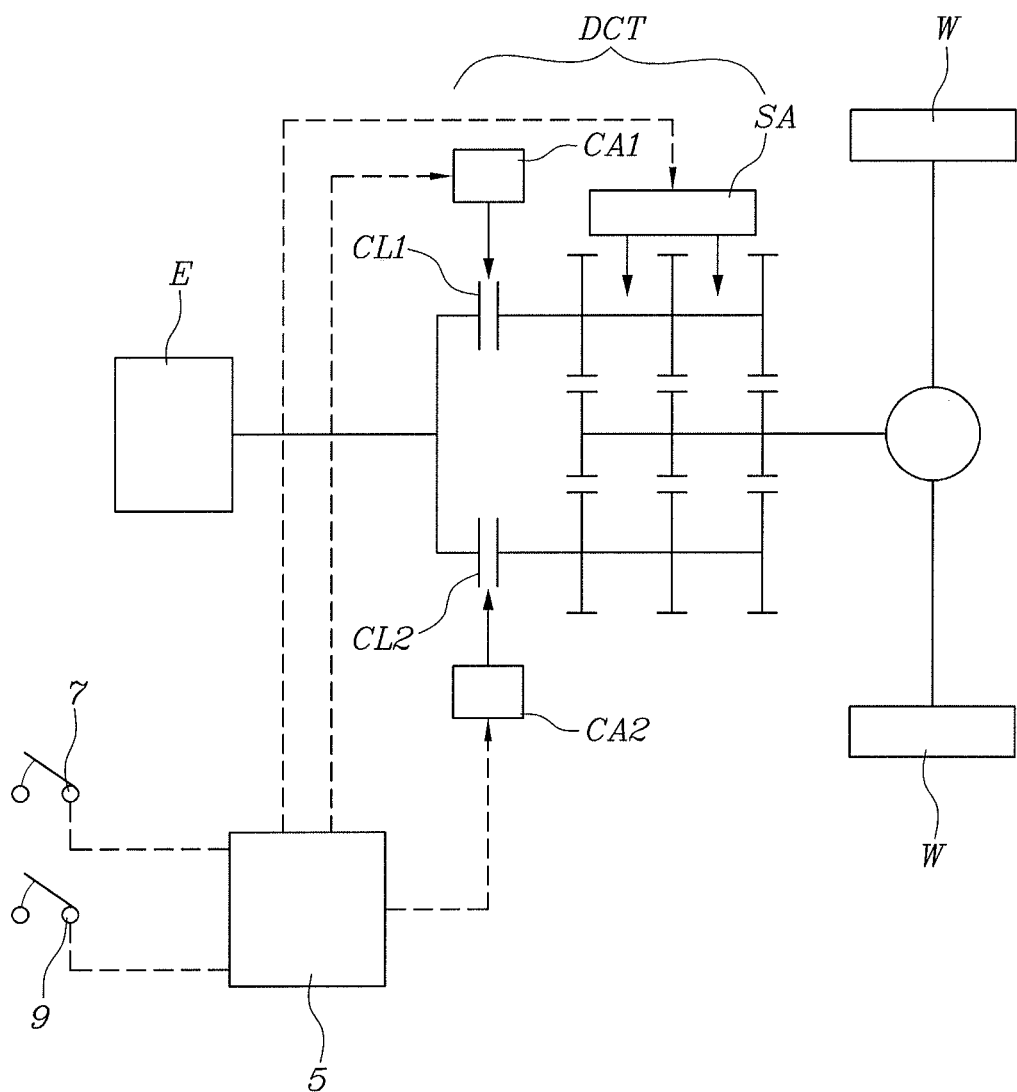
FIG. 1 is a schematic diagram of a DCT-provided vehicle to which an exemplary embodiment of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 is a configuration example of a vehicle with a dual clutch transmission (DCT) to which the present invention may be applied. Power of an engine E may be provided to driving wheels W through the DCT. An odd-numbered clutch CL1 and an even-numbered clutch CL2, which are two clutches configuring the DCT, are controlled by an odd-numbered clutch actuator CA1 and an even-numbered clutch actuator CA2, respectively, and shifting gears forming the each shifting stage are shifted by a shift actuator SA that selects and drives the synchronizers.

The actuators are controlled by a controller 5, and the controller 5 is connected to an accelerator position sensor (APS) 7 for receiving an operation amount of an accelerator pedal, and is connected to a brake pedal sensor (BPS) 9 for receiving an operation amount of a brake pedal.

In addition to this, the controller 5 receives information such as a transmission range selection state, an engine torque, an engine speed, and the like.

Meanwhile, the engine is controlled by a separate engine management system (EMS), and the controller 5 communicates with the EMS to receive information related to the engine. When the engine requests the EMS to adjust torque of the engine in accordance with a running situation and a shifting situation of the vehicle, the EMS controls the engine in a response to the request.

For reference, the controller 5 as described above may be configured as a transmission management system (TMS). In some cases, the controller 5 may be configured as an integrated control system that integrates the EMS and the TMS.

Here, the "controller" simply means a controller that is configured to control the DCT.

During the shifting, one of the odd-numbered clutch CL1 and the even-numbered clutch CL2 performs a releasing action and the other thereof performs a coupling action. Therefore, depending on a shifting situation, one of the two clutches is a releasing clutch and the other thereof is a coupling clutch.

However, since the shifting is performed from an N-th stage, which is a current stage, to a final target stage, which is an N−2-th stage, and an N−1-th stage, which is an intermediate target stage, is present, there is a possibility of confusion when using terms of the coupling clutch and the releasing clutch as described above. Therefore, hereinafter, a clutch that transfers the power when running in the N-th stage will be referred to as an N-th stage clutch, a clutch that transfers the power when running in the N−1-th stage will be referred to as an N−1-th stage clutch, and a clutch that transfers the power when running in the N−2-th stage will be referred to as an N−2-th stage clutch.

For example, when the current shifting stage is a third stage, the N-th stage means the third stage, and the N-th stage clutch means an odd-numbered clutch that transfers the driving force to the driving wheels by transferring the power of the engine to the DCT when the vehicle drives in the third stage. The N−1-th stage is the second stage, which is the intermediate target stage, and the N−1-th stage clutch means the even-numbered clutch that transfers the power when the vehicle drives in the second stage. The N−2-th stage is the first stage, which is the final target stage, and the N−2-th stage clutch is the odd-numbered clutch.

That is, the N-th stage clutch and the N−2-th stage clutch are the same odd-numbered clutch.

Furthermore, a clutch speed is hereinafter mentioned. The clutch speed has the same meaning as a speed of an input shaft to which the corresponding clutch is connected. That is, for example, a speed of the N-th stage clutch means a speed of an odd-numbered input shaft, which is an input shaft implementing the third stage in the example.

Figure 2:
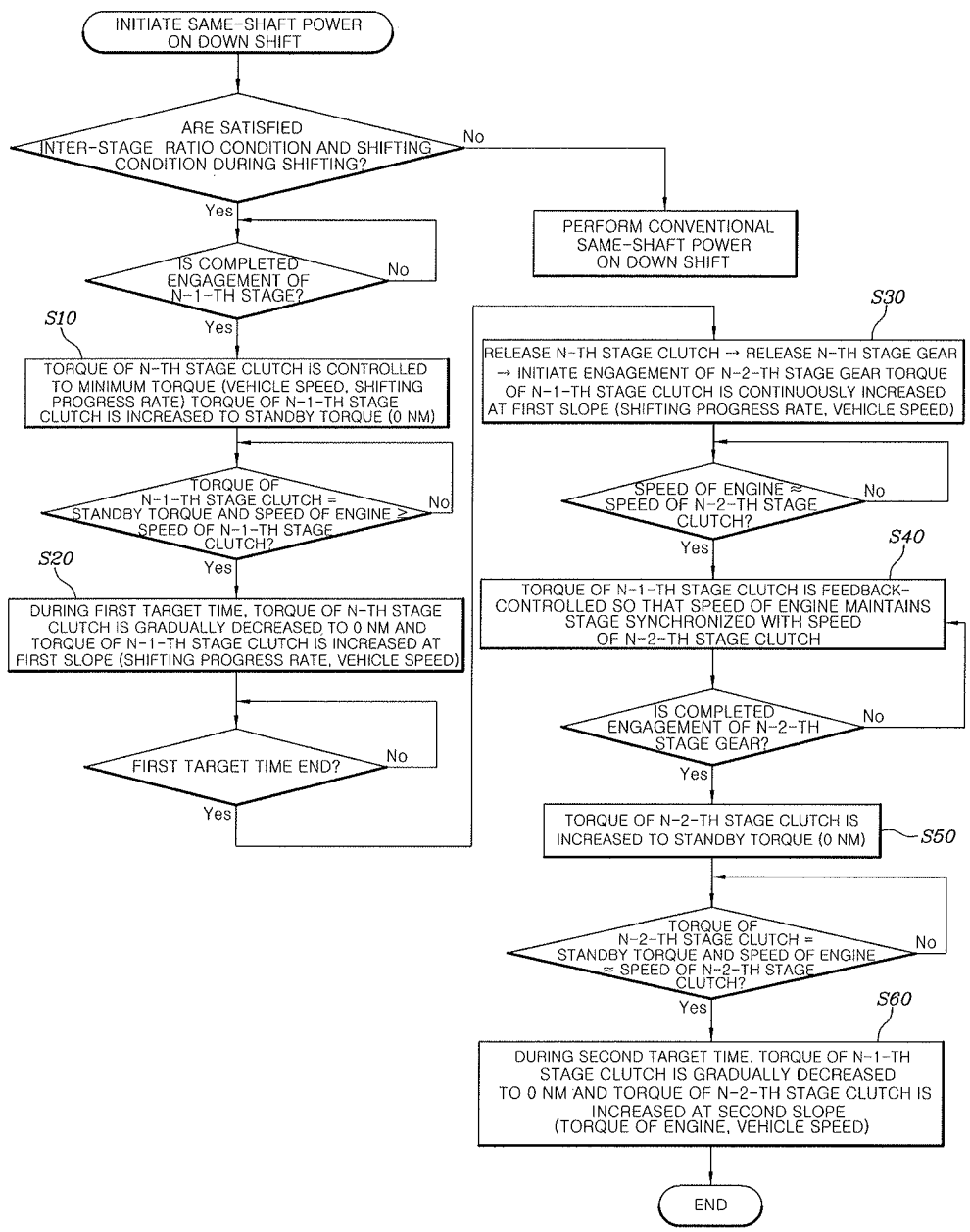
FIG. 2 is a flowchart illustrating an exemplary embodiment of a shift control method of a vehicle with a DCT according to an exemplary embodiment of the present invention.
Figure 3:
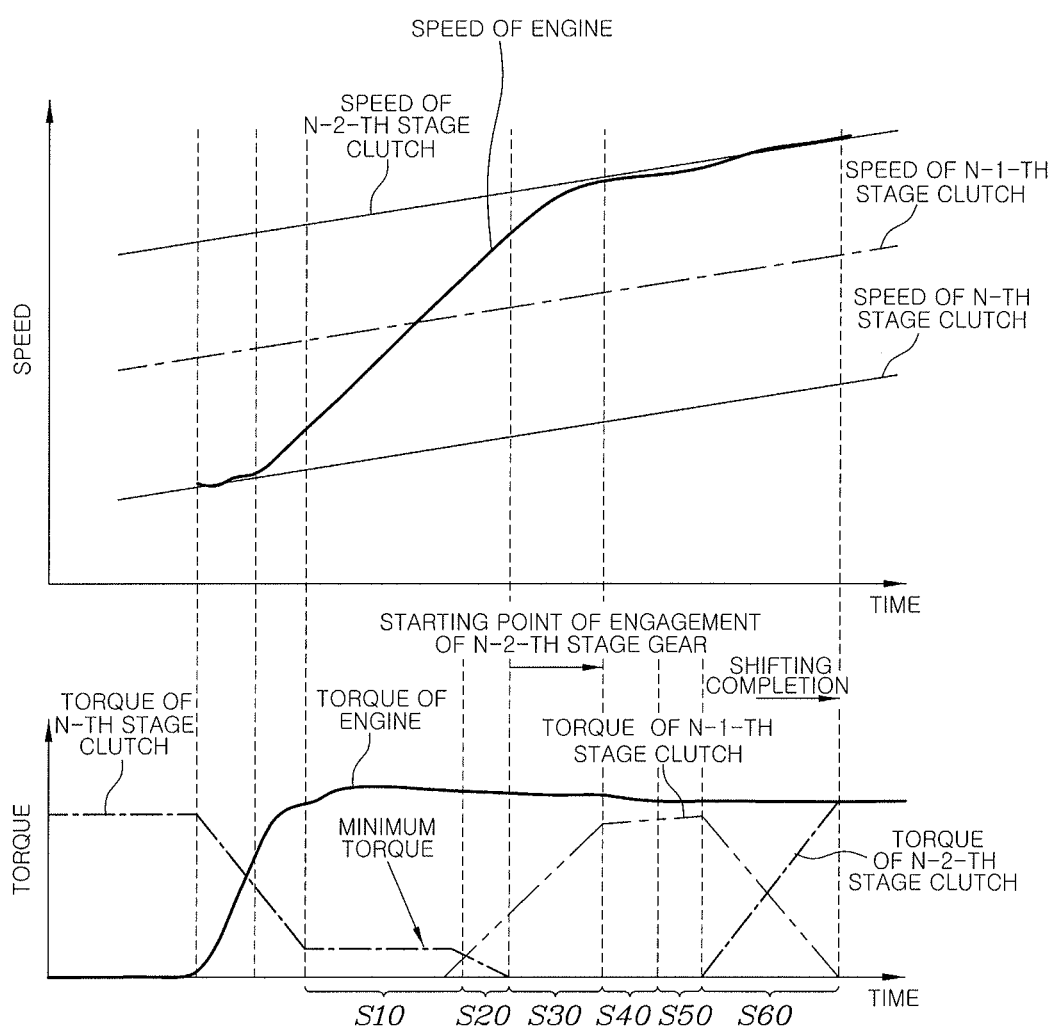
FIG. 3 is a diagram representing, as a graph, the shift control method of a vehicle with a DCT according to an exemplary embodiment of the present invention.

Referring to FIG. 2 and FIG. 3, a shifting control method of a vehicle with a dual-clutch transmission (DCT) according to an exemplary embodiment of the present invention includes a first preparing step (S10) of, by a controller, controlling a torque of an N-th stage clutch to a predetermined minimum torque and increasing a torque of an N−1-th stage clutch to a predetermined standby torque, when a same-shaft power on down shift is initiated and an engagement of an N−1-th stage gear is completed; a first handover step (S20) of, by the controller, releasing the torque of the N-th stage clutch and increasing the torque of the N−1-th stage clutch, when the torque of the N−1-th stage clutch reaches the standby torque and a rotation speed of an engine is equal to or greater than a speed of the N−1-th stage clutch; a gear changing step (S30) of, by the controller, releasing an N-th stage gear and then initiating an engagement of an N-2-th stage gear; a synchronization maintaining step (S40) of, by the controller, maintaining a synchronized state by adjusting the torque of the N-1-th stage clutch when it is determined that the rotation speed of the engine is synchronized with a speed of the N-2-th stage clutch; a second preparing step (S50) of, by the controller, increasing the torque of the N-2-th stage clutch to the standby torque when the engagement of the N-2-th stage gear is completed; and a second handover step (S60) of, by the controller, releasing the torque of the N-1-th clutch and increasing the torque of the N-2-th stage clutch, when the torque of the N-2-th stage clutch reaches the standby torque.

That is, according to an exemplary embodiment of the present invention, when the same-shaft power on down shift is initiated, a faster increase in the rotation speed of the engine is achieved by controlling the torque of the N-th stage clutch to the minimum torque through the first preparing step (S10). When the rotation speed of the engine is equal to or greater than the speed the N-1-th stage clutch, the rotation speed of the engine is controlled to be smoothly synchronized with the speed of the N-2-th stage clutch, which is the final target stage, by reducing a slope of the increase in the rotation speed of the engine with the N-1-th clutch. As a result, a fast and smooth same-shaft power on down shift may be performed.

For reference, when the power on down shift is initiated, the N-1-th stage gear engagement is basically initiated.

The controller may be configured to determine whether an inter-stage ratio between the N-th stage, which is the current stage, and the N-2-th stage, which is the final target stage, is equal to or greater than a predetermined reference inter-stage ratio, before the first preparing step (S10), and perform the first preparing step (S10) only when the inter-stage ratio is equal to or greater than the predetermined reference inter-stage ratio.

A transmission of the vehicle has a tendency that the inter-stage ratio becomes larger as it goes to a lower stage, and the inter-stage ratio becomes smaller as it goes to a higher stage. The large inter-stage ratio means that a speed difference at which the rotation speed of the engine is to be changed is as great as during the shifting. When the speed difference at which the rotation speed of the engine is to be changed is large, the time required for the shifting becomes longer, so that the inter-stage ratio between the current stage and the final target stage is large and the speed difference at which the rotation speed of the engine is to be changed is large during the shifting. Therefore, a faster shifting is achieved by performing the present invention from the first preparing step (S10) only when the time required for shifting becomes too long, and a conventional same-shaft power on down shift is performed otherwise.

Therefore, the predetermined reference inter-stage ratio is determined to be designed by experiment and analysis according to the above-mentioned purpose. For example, in a case of forward 8-speed DCT, since the present invention may be applied to the same-shaft power on down shift between the shifting stages of a fourth stage or less, the predetermined reference inter-stage ratio may be determined as a value slightly smaller than an inter-stage ratio between the fourth stage and a second stage, or an inter-stage ratio between a third stage and a first stage.

For reference, the inter-stage ratio is expressed as a ratio of shifting ratios, and for example, the inter-stage ratio between the fourth stage and the second stage means a second stage shifting ratio/fourth stage shifting ratio.

Meanwhile, as described above, instead of determining a level of the inter-stage ratio between the N-th stage, which is the current stage, and the N-2-th stage, which is the final target stage, it may be replaced with determining whether or not the speed difference between the speed of the N-th stage clutch and the speed of the N-2-th stage clutch is equal to or greater than the predetermined reference speed. This is because the speed difference between the two input shafts is large as the inter-stage ratio is large.

The controller may be configured to determine whether or not the current shifting is a shifting situation during shifting before the first preparing step (S10), and perform the first preparing step (S10) only when the current shifting is not the shifting situation during shifting.

The shifting situation during shifting refers to a case in which the shiftings are overlapped due to separate shifting requests occurring at different points in time but adjacent to each other, for example, a case in which the shifting to the second stage is initiated again while the shifting from the fifth stage to the third stage proceeds. Since an unstable control situation may occur in such a shifting situation during shifting, the control according to an exemplary embodiment of the present invention is not performed and the conventional same-shaft power one down shift is performed in such a situation.

In the first preparing step (S10), the minimum torque which is the control target of the torque of the N-th stage clutch has a value which is as small as possible so that the rotation speed of the engine increases faster than that in the case of the common same-shaft power on down shift, and is set to a level which may affect the rotation speed of the engine to prevent the rotation speed of the engine from rising excessively and causing a problem such as an impact. Therefore, the minimum torque may be determined to be designed by a plurality of experiments and analyses to be determined according to a vehicle speed and a shifting progress rate.

For example, as the vehicle speed is lower, the minimum torque has a smaller value, achieving a faster increased in the rotation speed of the engine. As the shifting progress rate is larger, the minimum torque has a larger value, suppressing an excessive increase in the rotation speed of the engine.

For example, the shifting progress rate may be determined as (Speed of Engine—Speed of Releasing Clutch)/(Speed of Coupling Clutch—Speed of Releasing Clutch).

Meanwhile, the standby torque is substantially 0 Nm, which means that the clutch is controlled to be in the vicinity of a touch point, so that when the torque of the clutch is to be increased, the torque of the clutch may be immediately increased.

That is, in the first preparing step (S10), the increasing of the torque of the N-1-th stage clutch to the standby torque means that the clutch actuator is driven in a direction in which the clutch is engaged from a state in which the N-1-th stage clutch is completely separated before the touch point and the clutch is moved to the vicinity of the touch point.

In the first handover step (S20), the controller increases the torque of the N-1-th stage clutch at a predetermined first slope while releasing the torque of the N-th stage clutch during a predetermined first target time.

The first target time may be set according to the vehicle speed and the torque of the engine. For example, as the vehicle speed is lower, the first target time is set to be shorter, and as the torque of the engine is larger, the first target time is set to be shorter. Accordingly, as the vehicle speed is lower and the torque of the engine is larger, the first handover step (S20) may be more rapidly completed. The first target time is set to be designed by a plurality of experiments and analyses.

The first slope may be set according to the vehicle speed and the shifting progress rate. For example, as the shifting progress rate is lower and the vehicle speed is lower, the first slope is set to be larger, increasing more rapidly the torque of the N−1-th stage clutch. The first slope is also set to be designed by a plurality of experiments and analyses.

In the gear changing step (S30), the controller releases the N-stage gear and initiates the engagement of the N−2-th gear, after completely releasing the torque of the N-th stage clutch.

That is, in performing the gear changing step (S30) after the first handover step (S20) is completed, after the N-th stage clutch is completely farther away from the touch point by completely releasing the torque of the N-th stage clutch, the N-th stage gear is released and the engagement of the N−2-th gear is attempted so that a more smooth releasing of the N-th stage gear and a smooth engagement of the N−2-th stage gear are achieved.

During the gear changing step (S30), the controller increases the torque of the N−1-th stage clutch in succession to the first handover step.

That is, the increase in the torque of the N−1-th stage clutch at the first slope in the first handover step (S20) also continues continuously during the gear changing step.

In the synchronization maintaining step (S40), the controller feedback-controls the torque of the N−1-th stage clutch to maintain the synchronized state.

If the engagement of the N−2-th stage gear is completed while the rotation speed of the engine maintains a state synchronized with the speed of the N−2-th stage clutch, the controller performs the second preparing step (S50) to increase the torque of the N−2-th stage clutch to the standby torque.

If the torque of the N−2-th stage clutch reaches the standby torque, the controller performs the second handover step (S60). In the instant case, only when the rotation speed of the engine maintains the state synchronized with the speed of the N−2-th stage clutch for a predetermined time, the controller performs the second handover step (S60) thereby achieving a stable shifting finish.

That is, when the rotation speed of the engine does not temporarily maintain the state synchronized with the speed of the N−2-th stage clutch and a speed difference occurs, even in a state in which the torque of the N−2-th stage clutch reaches the standby torque, when the second handover step (S60) is performed, a problem such as an abnormal increase in the rotation speed of the engine or the like may occur. Therefore, the synchronized state of the rotation speed of the engine is further confirmed so that the shifting may be completed more reliably.

In the second handover step (S60), the controller increases the torque of the N−2-th stage clutch at a predetermined second slope while releasing the torque of the N−1-th stage clutch during a predetermined second target time.

The second target time may also be determined by a functional relationship between the vehicle speed and the torque of the engine. For example, as the vehicle speed is lower, the second target time is set to be shorter, and as the torque of the engine is larger, the second target time is set to be shorter. Accordingly, as the vehicle speed is lower and the torque of the engine is larger, the second handover step (S20) may be more rapidly completed. The second target time is set to be designed by a plurality of experiments and analyses.

The second slope may be set according to the torque of the engine and the vehicle speed. For example, as the torque of the engine is larger and the vehicle speed is lower, the second slope is set to be larger, increasing more rapidly the torque of the N−2-th stage clutch. The second slope is also set to be designed by a plurality of experiments and analyses.

As described above, when the second handover step (S60) is completed, the same-shaft power on down shift according to an exemplary embodiment of the present invention is completed.

According to an exemplary embodiment of the present invention, a commercial value of a vehicle may be ultimately improved by improving shifting responsiveness to minimize disadvantages of the DCT with faster same-shaft down shift at the time of the same-shaft power on down shift by an accelerator pedal operation of a driver in a DCT-provided vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift control method of a vehicle mounted with a dual clutch transmission (DCT), the shifting control method comprising:
   a first preparing step of, by a controller, controlling a torque of an N-th stage clutch to a predetermined minimum torque and increasing a torque of an N−1-th stage clutch to a predetermined standby torque, in a response that a same-shaft power on down shift is initiated and an engagement of an N−1-th stage gear is completed;
   a first handover step of, by the controller, releasing the torque of the N-th stage clutch and increasing the torque of the N−1-th stage clutch, in a response that the torque of the N−1-th stage clutch reaches the predetermined standby torque and a rotation speed of an engine is equal to or greater than a speed of the N−1-th stage clutch;
   a gear changing step of, by the controller, releasing an N-th stage gear and then initiating an engagement of an N−2-th stage gear;
   a synchronization maintaining step of, by the controller, maintaining a synchronized state by adjusting the torque of the N−1-th stage clutch in a response that it is determined by the controller that the rotation speed of the engine is synchronized with a speed of the N−2-th stage clutch;

a second preparing step of, by the controller, increasing the torque of the N−2-th stage clutch to the predetermined standby torque in a response that the engagement of the N−2-th stage gear is completed; and a second handover step of, by the controller, releasing the torque of the N−1-th clutch and increasing the torque of the N−2-th stage clutch, in a response that the torque of the N−2-th stage clutch reaches the predetermined standby torque.

2. The shifting control method of claim 1,
wherein the controller is configured to determine when an inter-stage ratio between an N-th stage, which is a current stage, and an N−2-th stage, which is a final target stage, is equal to or greater than a predetermined reference inter-stage ratio, before the first preparing step, and is configured to perform the first preparing step in a response that the inter-stage ratio is equal to or greater than the predetermined reference inter-stage ratio.

3. The shifting control method of claim 1,
wherein the controller is configured to determine when a current shifting is a shifting situation during shifting before the first preparing step, and is configured to perform the first preparing step in a response that the current shifting is not the shifting situation during shifting.

4. The shifting control method of claim 1,
wherein in the first handover step, the controller is configured to increase the torque of the N−1-th stage clutch at a predetermined first slope while releasing the torque of the N-th stage clutch during a predetermined first target time.

5. The shifting control method of claim 1,
wherein in the gear changing step, the controller is configured to release the N-stage gear and initiates the engagement of the N−2-th gear, after completely releasing the torque of the N-th stage clutch.

6. The shifting control method of claim 5,
wherein the controller is configured to increase the torque of the N−1-th stage clutch in succession to the first handover step during the gear changing step.

7. The shifting control method of claim 1,
wherein in the synchronization maintaining step, the controller is configured to feedback-control the torque of the N−1-th stage clutch to maintain the synchronized state.

8. The shifting control method of claim 1,
wherein the controller is configured to verify when the rotation speed of the engine maintains a state synchronized with the speed of the N−2-th stage clutch for a predetermined time in a response that the torque of the N−2-th stage clutch reaches the predetermined standby torque, and is configured to perform the second handover step in a response that the synchronized state is maintained.

9. The shifting control method of claim 1,
wherein in the second handover step, the controller is configured to increase the torque of the N−2-th stage clutch at a predetermined second slope while releasing the torque of the N−1-th stage clutch during a predetermined second target time.

\* \* \* \* \*